(12) United States Patent
Patel et al.

(10) Patent No.: US 8,450,892 B2
(45) Date of Patent: May 28, 2013

(54) SYNCHRONOUS GENERATING MACHINE WITH RECTIFIER SNUBBER CIRCUIT

(75) Inventors: Dhaval Patel, Rockford, IL (US); Donal E. Baker, Rockford, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 225 days.

(21) Appl. No.: 12/579,743

(22) Filed: Oct. 15, 2009

(65) Prior Publication Data

US 2011/0089779 A1 Apr. 21, 2011

(51) Int. Cl.
*H02K 11/00* (2006.01)
(52) U.S. Cl.
USPC .......................... 310/68 D; 310/71
(58) Field of Classification Search
USPC ................... 310/68 D, 71, 112–114
See application file for complete search history.

(56) References Cited

U.S. PATENT DOCUMENTS

| | | | |
|---|---|---|---|
| 4,535,377 A * | 8/1985 | Lane ................................. | 361/1 |
| 4,623,762 A | 11/1986 | Boeckmann et al. | |
| 4,977,493 A | 12/1990 | Smith | |
| 5,365,133 A * | 11/1994 | Raad ............................ | 310/68 D |
| 5,737,210 A * | 4/1998 | Barahia ........................ | 363/144 |
| 5,796,196 A * | 8/1998 | Johnsen et al. .............. | 310/68 D |
| 5,877,947 A | 3/1999 | Chen et al. | |
| 5,991,174 A | 11/1999 | Farrington et al. | |
| 6,396,672 B1 | 5/2002 | Deam | |
| 6,771,521 B1 | 8/2004 | Xiong et al. | |
| 6,980,447 B1 | 12/2005 | Schaible et al. | |
| 7,253,535 B2 | 8/2007 | Duesterhoeft | |
| 7,292,003 B1 | 11/2007 | Baker | |
| 7,486,053 B2 | 2/2009 | Qi et al. | |
| 7,550,953 B2 | 6/2009 | Shah | |
| 2007/0176501 A1 * | 8/2007 | Nishimura et al. ......... | 310/68 R |
| 2008/0074910 A1 | 3/2008 | Casteel et al. | |
| 2008/0079262 A1 * | 4/2008 | McGinley et al. ............. | 290/31 |

FOREIGN PATENT DOCUMENTS

| | | | |
|---|---|---|---|
| AT | 322034 | * | 4/1975 |
| AT | 322034 B | * | 4/1975 |

OTHER PUBLICATIONS

AT 322034 machine translation, May 18, 2011.*
AT322034 translation.*
Extended European Search Report Dated Mar. 7, 2011.

* cited by examiner

*Primary Examiner* — Tran Nguyen
*Assistant Examiner* — Leda Pham
(74) *Attorney, Agent, or Firm* — Carlson, Gaskey & Olds, PC

(57) ABSTRACT

A machine for generating electricity has an exciter rotor with a plurality of coils, and is associated with a shaft to be driven by a source of rotation. A diode bridge is connected downstream of the exciter rotor to provide a rectifier for an AC current generated by rotation of the exciter rotor. The diode bridge rectifies the AC generated current into DC current, which is passed downstream to windings for a main rotor. A snubber circuit is positioned intermediate said rectifier and said main rotor, said snubber circuit including both a resistor and a capacitor.

12 Claims, 1 Drawing Sheet

SYNCHRONOUS GENERATING MACHINE WITH RECTIFIER SNUBBER CIRCUIT

BACKGROUND OF THE INVENTION

This application relates to a snubber circuit for dissipating voltage spikes downstream of a rectifier in a synchronous machine.

Synchronous generators are typically provided with either permanent magnet rotors, or synchronous rotors. In a synchronous rotor, a main field rotor winding is provided with electrical current from an exciter. The exciter consists of a exciter stator and exciter rotor. Both rotors are fixed to a shaft which is driven to rotate by a prime mover. The exciter rotor rotates adjacent an exciter stator, and the main field winding rotates adjacent a main stator. Injection of DC current into the exciter stator during rotation of the exciter rotor generates alternating voltage which is sent through a rectifier and then to the main field windings.

Rectifiers are often provided by a diode bridge. The rectifier's main function is to take the AC voltage from the exciter rotor, and transform it into DC power being sent downstream to the main field windings.

Due to the operation of the diode bridge, commutation of the diodes causes transient voltages on the rectifier DC terminals. The transient voltages can exceed the diode ratings and damage the diodes. Additionally, the transients associated with commutation can cause electromagnetic inference. Additionally, external events such as connecting generators in parallel and load transients can cause transient voltages across the diodes, which could damage the diodes.

To handle these various transients, suppression circuits have been utilized in such machines. In many machines, the suppression circuit has been provided by a resistor across the main field winding. The resistor generally reduces the amplitude of a voltage spike but does not substantially eliminate it. However, the resistors create a heat source, and there arises a tradeoff between the ohmic value of the resistor and the amount of heat generated by the resistor.

Other suppression circuits utilize a capacitor, which provides good dissipation of the spikes. However, when associated with the main field winding, which is effectively an inductor, steady voltage oscillations result, which may be undesirable.

SUMMARY OF THE INVENTION

A synchronous machine for generating electricity has an exciter rotor with a plurality of coils, and is associated with a shaft to be driven by a prime mover. A diode bridge is connected downstream of the exciter rotor to provide a rectifier for the AC voltage generated by rotation of the exciter rotor. The diode bridge rectifies the generated AC voltage into DC voltage, which is passed downstream to windings of the main rotor. A snubber circuit is positioned intermediate to the said rectifier and said main rotor, said snubber circuit including both a resistor and a capacitor.

These and other features of the present invention can be best understood from the following specification and drawings, the following of which is a brief description.

DETAILED DESCRIPTION OF THE PREFERRED EMBODIMENT

Figure 1:
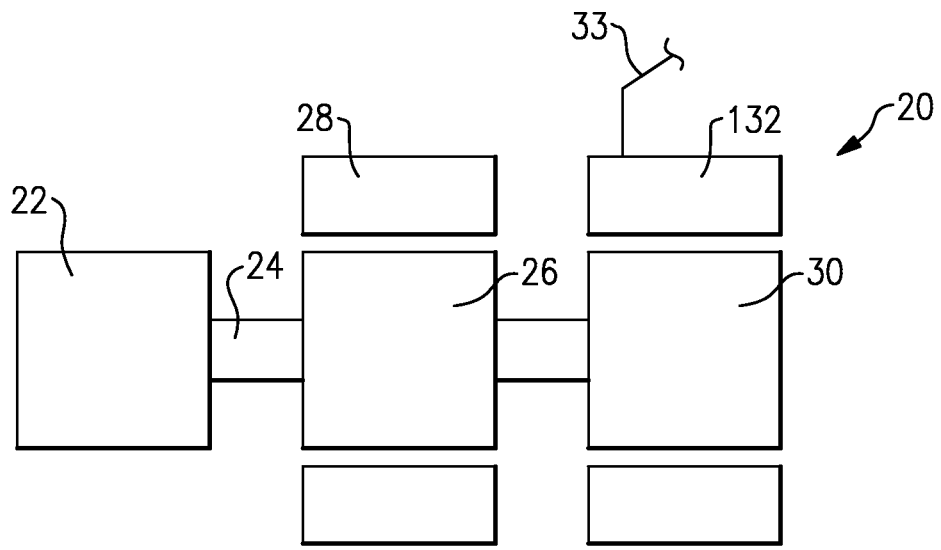
FIG. 1 schematically shows a synchronous machine.

As shown in FIG. 1, a synchronous machine, which may be a generator 20, is provided with a source of rotation 22, such as a gas turbine engine. The source of rotation 22 drives a shaft 24. Fixed to rotate with the shaft 24 is an exciter rotor 26 and a main field winding 30. The exciter rotor 26 rotates adjacent exciter stator 28, and the main field windings 30 rotate adjacent a main stator 132. As known, the rotation of the exciter rotor 26 adjacent the exciter stator 28 delivers electric power to power the main field winding 30. The rotation of the main field winding 30 adjacent the main stator 132 generates electrical power which may be sent across a line 33, shown schematically, to a downstream use of the power.

Figure 2:
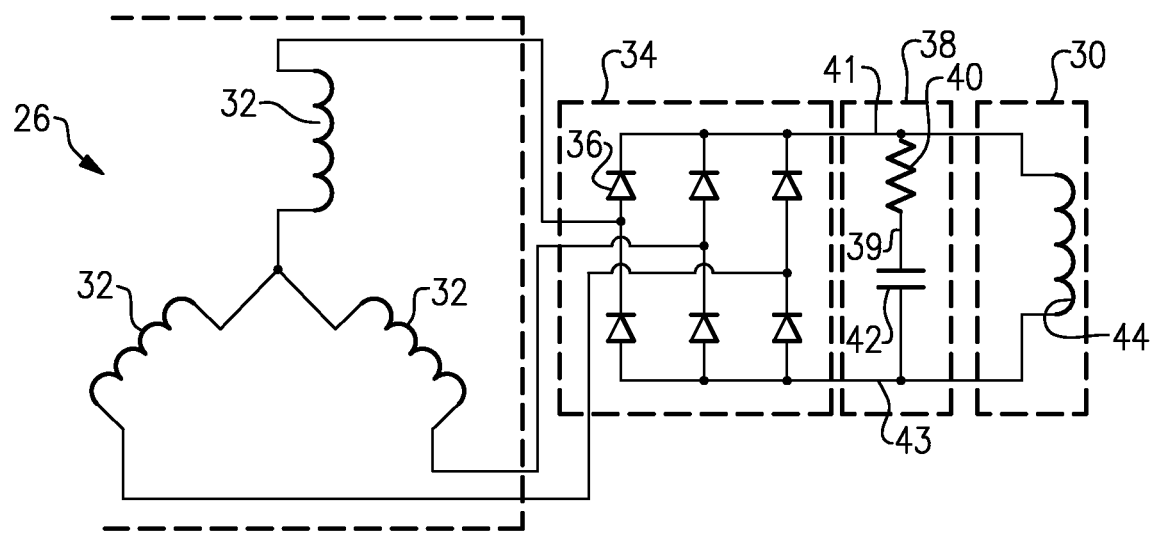
FIG. 2 is a schematic of a rotor associated with the FIG. 1 machine

FIG. 2 shows a simplified rotor circuit incorporating the exciter rotor 26 and the main field windings 30. As shown, three windings 32 are associated with the exciter rotor, and generates three phase power as the exciter rotor 26 is driven to rotate adjacent the exciter stator 28. This power passes downstream to a rectifier 34, here a diode bridge provided by a plurality of diodes 36. The rectifier essentially converts the generated AC voltage into a DC voltage which passes downstream to a snubber circuit 38 in parallel with the main field winding 44. The winding coil 44 is provided with DC voltage from the rectifier 34, such that when it is driven to rotate, it will interact with the main stator 132 and generate power.

The snubber circuit 38 is provided between lines 41 and 43, which connect the rectifier 34 to the main winding 30. As shown, a resistor 40 and the capacitor 42 are provided as a series connected resistor capacitor snubber circuit. The size of the snubber resistor 40 could preferably be sized so that the following relationship is met.

$$R = \sqrt{\frac{L}{C}}$$

where L is the total inductance of the main field winding 30 and one phase of the exciter rotor 32 and C is the snubber capacitor 42.

In embodiments, the resistor is of sufficient ohmage that it provides greater resistance than a simple wire. Generally, the resistor will be greater than 0.5 ohm, and often greater than 10 ohms. This sizing is in conjunction with a capacitor having a capacitance in the microfarad range, such that the RC combination provides the desired damping effect.

The combined use of the resistor and the capacitor provides synergistic benefits. With this combination, the resistor will only conduct electricity when there is a fast AC spike. Thus, the resistor will not provide the constant heat source as has been a concern in the prior art. Further, the oscillation which may have occurred with prior art "capacitor-only" snubber circuits is dampened by the resistor. As such, the combination of the two provides synergistic benefits.

While the capacitor and resistor are shown in series, in other embodiments, they can be mounted in parallel.

An embodiment of this invention has been disclosed, however a worker of ordinary skill in this art would recognize certain modifications would come within the scope of this invention, as an example a parallel connected resistor capacitor snubber. For that reason, the following claims should be studied to determine the true scope and content of this invention

What is claimed is:

1. A machine rotor for generating electricity comprising:
an exciter rotor having a plurality of coils, and associated with a shaft to be driven by a source of rotation;
a rectifier for rectifying generated AC voltage into DC voltage for passing downstream to a main rotor winding;
a snubber circuit positioned intermediate to said rectifier and said main rotor winding, said snubber circuit including both a resistor and a capacitor; and
wherein a resistance for said resistor is based at least in part on an inductance of the main rotor winding.

2. The rotor as set forth in claim 1, wherein there are two connections leading from said rectifier downstream toward said main rotor winding, and a wire or bus bar connecting said two connections, with said resistor and said capacitor being mounted onto the wire or bus bar such that it is mounted in parallel with said main rotor winding.

3. The rotor as set forth in claim 2, wherein said rectifier is provided by a diode bridge.

4. The rotor as set forth in claim 1, wherein said rectifier is provided by a diode bridge.

5. The rotor as set forth in claim 1, wherein said resistor has a resistance of at least 0.5 ohms.

6. A machine for generating electricity comprising:
a shaft to be driven by a source of rotation, an exciter stator positioned outwardly of an exciter rotor, said exciter rotor being connected to rotate with said shaft;
a main stator, said main stator being positioned outwardly of a main rotor winding, said main rotor winding also being connected to rotate with said shaft;
the exciter rotor having a plurality of coils, and associated to rotate with the shaft;
a diode bridge connected downstream of said exciter rotor to provide a rectifier for an AC current generated by rotation of the exciter rotor, said diode bridge rectifying AC current into DC current for passing downstream to the main rotor winding;
a snubber circuit positioned intermediate said diode bridge and said main rotor winding, said snubber circuit including both a resistor and a capacitor wherein there are two connections leading from said diode bridge downstream toward said main rotor winding, and a wire or bus bar connecting said two connections, with said resistor and said capacitor being mounted on the wire or bus bar such that they are mounted in parallel with said main rotor winding; and
wherein a resistance for said resistor is based at least in part on an inductance of the main rotor winding.

7. The machine as set forth in claim 6, wherein said resistor has a resistance of at least 0.5 ohms.

8. The machine as set forth in claim 6, wherein said resistor is connected to one of said two connections, and said capacitor is connected to the other of said two connections.

9. The rotor as set forth in claim 2, wherein said resistor is connected to one of said two connections, and said capacitor is connected to the other of said two connections.

10. The rotor as set forth in claim 1, wherein said resistance R is $$R = \sqrt{\frac{L}{C}},$$

wherein L is a total inductance of the main rotor winding and one phase of the exciter rotor, and C is the capacitance of said capacitor.

11. The machine as set forth in claim 6, wherein said resistance 1 is $$R = \sqrt{\frac{L}{C}},$$

wherein L is a total inductance of the main rotor winding and one phase of the exciter rotor, and C is the capacitance of said capacitor.

12. The machine as set forth in claim 6, wherein said source of rotation is a gas turbine engine.

* * * * *